United States Patent [19]

Redzinski

[11] Patent Number: 4,608,873
[45] Date of Patent: Sep. 2, 1986

[54] ELECTIVE AUTOMATIC SHIFT TRANSMISSION

[75] Inventor: Gilbert E. Redzinski, Niles, Mich.

[73] Assignee: Clark Equipment Company, Buchanan, Mich.

[21] Appl. No.: 488,907

[22] Filed: Apr. 27, 1983

[51] Int. Cl.$^4$ .......................... B60K 41/04; F16H 5/42
[52] U.S. Cl. ..................................... 74/866; 74/336 R
[58] Field of Search ................ 74/855, 856, 861, 866, 74/336 R, 365, 359; 364/424.1

[56] References Cited

U.S. PATENT DOCUMENTS

| | | | |
|---|---|---|---|
| 3,126,752 | 3/1964 | Bolster | 74/359 |
| 3,665,779 | 5/1972 | Mori | 74/866 |
| 3,682,014 | 8/1972 | Magg et al. | 74/866 |
| 3,732,755 | 5/1973 | Beig et al. | 74/866 |
| 3,937,107 | 2/1976 | Lentz | 74/861 |
| 4,148,231 | 4/1979 | Redzinski | 74/866 |
| 4,164,876 | 8/1979 | Peppel | 74/365 |
| 4,301,689 | 11/1981 | Peppel | 74/866 |
| 4,319,501 | 3/1982 | Sugimoto | 74/866 |
| 4,411,174 | 10/1983 | Yokoi et al. | 74/861 |
| 4,421,192 | 12/1983 | Ito et al. | 74/866 |

Primary Examiner—Kenneth J. Dorner
Assistant Examiner—David Novais
Attorney, Agent, or Firm—Reising, Ethington, Barnard, Perry & Milton

[57] ABSTRACT

An automatic transmission shift control system is provided for work vehicles, such as front-end loaders, which permits automatic shifting between first and second gears in response to vehicle speed but which inhibits downshift for a predetermined time interval after initiating reversal of the vehicle. A speed signal generator produces shift point signals at predetermined speed values and a speed logic circuit responds to the shift point signal for producing respective upshift and downshift signals. An inhibit circuit produces an inhibit signal in response to a reversing signal. The speed logic circuit is responsive to the inhibit signal for delaying the change from an upshift control signal to a downshift control signal for a time interval corresponding to the duration of the inhibit signal. The inhibit circuit is disabled when the speed decision logic circuit produces a downshift signal so that an upshift of the transmission may occur during reversal.

6 Claims, 7 Drawing Figures

ELECTIVE AUTOMATIC SHIFT TRANSMISSION

FIELD OF THE INVENTION

This invention relates to work vehicles, such as front-end loaders; more particularly, it relates to a control system for such vehicles to provide automatic shifting of the change-speed transmission.

BACKGROUND OF THE INVENTION

In the operation of earth-moving vehicles, such as front-end loaders, a common work cycle is that of loading the bucket from a pile and unloading it into a truck. In such a work cycle, the operator of the loader approaches the pile in second gear from a travel portion of the work cycle and initially crowds the pile with the bucket in second gear. Then the operator usually shifts to first gear as the load on the engine is increased by prying or bucket-lifting operations. When the bucket is loaded, the operator reverses the transmission and backs the loader away from the pile, starting in first gear and then upshifting to second gear for the travel portion of the work cycle. In the travel portion, the front-end loader is commonly turned around to approach the truck in the forward direction, the turn-around being executed by decelerating in reverse on a turning radius and then accelerating in forward on a diverging turning radius. In the turn-around maneuver, downshifting of the transmission from second to first gear for acceleration in the forward direction may impose a severe shock on the driveline of the vehicle with resulting damage. It is therefore desirable to complete the reversal while in second gear and then downshift to first gear for acceleration in the forward direction. The transmission may be upshifted to second during the travel to the truck for unloading of the bucket. For returning to the pile, the loader is reversed and performs the turn-around maneuver as described above.

Such a work cycle, as just described, requires repeated shifting between first and second gears and repeated direction reversals. The manual shifting is very demanding on the operator and results in inefficient operation. Accordingly, front-end loaders are commonly provided with an automatic shift control system so that the transmission is shifted between first and second gears in response to a vehicle speed signal with an upshift at a predetermined speed value and a downshift at a lower speed value. Such a transmission shift control system is disclosed in U.S. Pat. No. 4,301,689 which is assigned to the same assignee as this invention.

While the automatic shift control system as described above is effective to relieve the operator of repeated shifting between first and second gears, a work cycle which requires a deceleration-reversal-acceleration pattern may result in downshifting during reversal and damage to the driveline. It is therefore desirable to provide additional automatic control which will prevent downshifting during reversal but will permit upshifting during reversal since it is not harmful to the driveline.

Automatic means for reducing the shock on the driveline during reversal have been proposed in the prior art.

In the Peppel U.S. Pat. No. 4,164,876, assigned to the same assignee as this invention, a downshift inhibitor circuit is provided for a powershift transmission. As disclosed in the Peppel patent, the purpose of the downshift inhibitor is to prevent downshifting when a reversal is executed at full throttle. When a reversal is executed at part throttle a downshift does occur within a predetermined time after a downshift signal is generated. This system comprises a delay circuit connected between a speed sensor switch and the solenoid shift valves. The direction control lever actuates a reversing switch on each reversal. When the speed sensor switch calls for second gear, actuation of the reversing switch starts a timer which prevents actuation of the solenoid shift valve until a predetermined time delay after the speed sensor switch shifts to first gear. Accordingly, when the reversal is made at full throttle in second gear, the vehicle will accelerate fast enough during the predetermined time interval so that the speed is back up to the second gear speed range at the end of the time delay and no downshift occurs. On the other hand, if the reversal is made at part throttle, the vehicle speed will still be in the first gear speed range at the end of the time interval and the downshift will occur.

It is a general object of this invention to provide a downshift inhibitor which overcomes certain disadvantages of the prior art.

SUMMARY OF THE INVENTION

In accordance with this invention, an automatic transmission shift control system is provided for work vehicles, such as front-end loaders, which will permit automatic shifting between first and second gears in response to vehicle speed but which inhibits downshift for a predetermined time interval after initiating reversal of the vehicle.

Further, in accordance with this invention, an inhibit means responsive to a reversing signal produces an inhibit signal having a predetermined time duration after the occurrence of the reversing signal. A shift point signal means produces a second gear signal when the vehicle speed increases above a first predetermined value and a first gear signal when it decreases below a second predetermined value. A speed decision logic circuit includes means coupled with the shift point means for producing respective upshift and downshift signals. It is responsive to the inhibit signal for delaying the change from an upshift control signal to a downshift control signal for a time interval corresponding to the duration of the inhibit signal. The time interval is at least as long as the time required for operation of the reversing means, whereby the transmission cannot be downshifted while the drive reversing means is being actuated.

Further, in accordance with this invention, a manually actuable mode selector means turns the automatic control system on or off through a gear decision logic circuit which is coupled with the speed decision logic circuit. The gear decision logic circuit produces a control signal for automatically shifting the transmission. The gear decision logic circuit develops a second gear or first gear control signal in response to the upshift or the downshift respective signals when the automatic system is turned on. It is operative to develop only second gear control signal when it is off. A gear signal means is coupled with the gear decision logic circuit and produces second gear signal only when the manual gear selector is in second gear. The gear signal means is operative to turn off the automatic control unless a second gear signal is produced. Control means for shifting the transmission between the first and second gears is energized by a driver circuit in accordance with first gear and second gear control signals.

A more complete understanding of this invention may be obtained from the detailed description that follows taken with the accompanying drawings.

BEST MODE FOR CARRYING OUT THE INVENTION

Referring now to the drawings, there is shown an illustrative embodiment of the invention in a transmission control system for a powershift transmission especially adapted for use in front-end loaders and the like. It will be appreciated as the description proceeds that the control system of this invention is useful in other applications and may be embodied in other forms.

Figure 1:
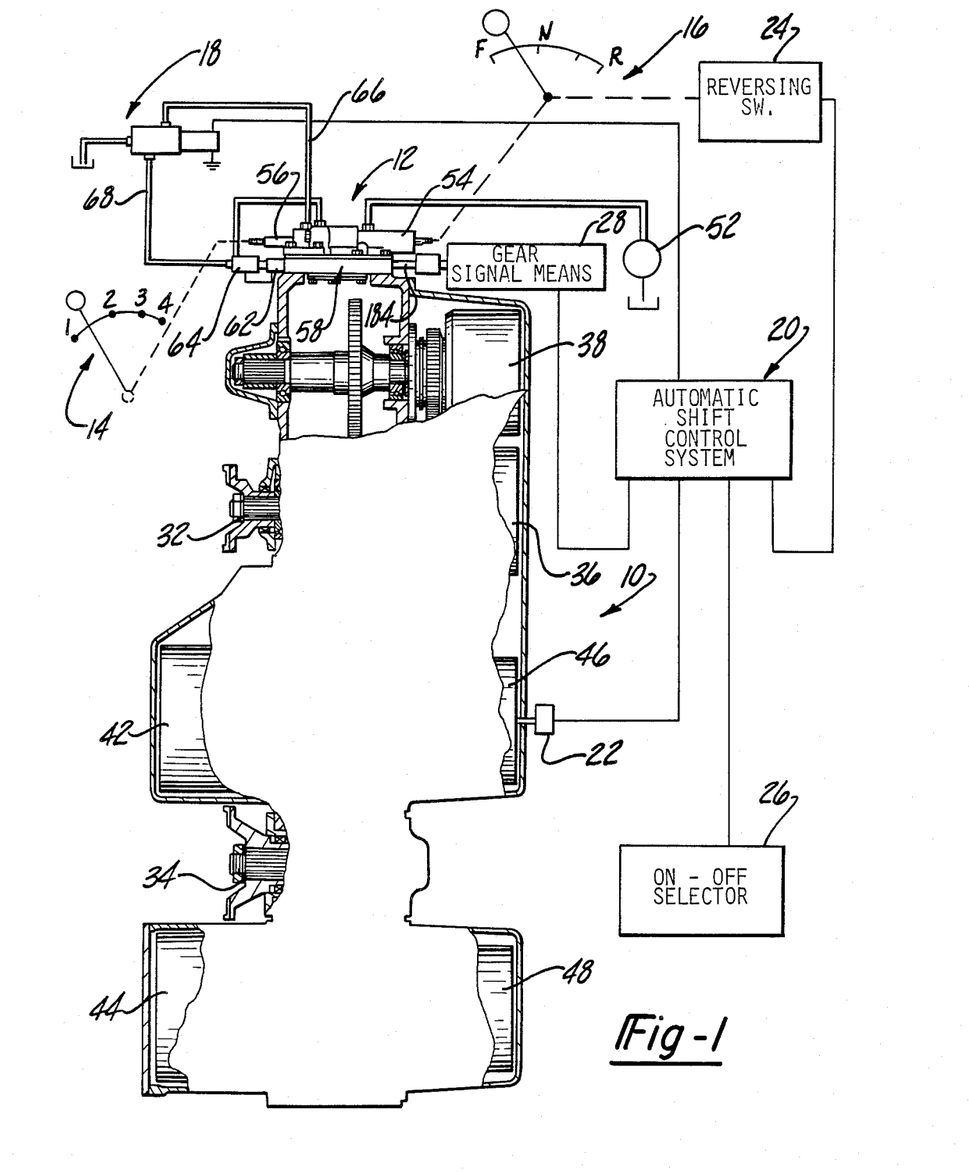
FIG. 1 shows a change-speed powershift transmission with the automatic shift control system of this invention.

Reference is made to FIG. 1 which illustrates the control system of this invention in conjunction with a known type of powershift transmission. In general, the system comprises a powershift transmission 10 which includes a hydraulic control unit 12 for controlling the fluid energization of the clutches of the transmission. The transmission is provided with a manually actuable gear selector 14 and a manually actuable reversing lever 16 both of which are mechanically linked with the control unit 12. The transmission also includes a solenoid valve 18 which is hydraulically connected with the control unit 12 for controlling the shift between first and second gears, as will be described in detail below. An automatic shift control system 20, in accordance with this invention, develops a control signal for the solenoid valve 18. The control system 20 develops the control signal in response to several input signals. A speed transducer 22 develops a signal corresponding to the speed of the transmission output shaft and hence ground speed of the vehicle and this signal is applied as one input to the control system 20. A reversing signal means 24 is actuated by the reversing control lever 16 and develops a reversing signal which is applied as another input to the control system 20. An on/off selector 26 develops an on/off signal which is applied as an input to the automatic control system for manually turning it on or off. A gear signal means 28 develops a signal indicative of whether the transmission is in the second gear or in some other gear and this signal is applied as another input to the automatic control system 20.

General Description

Referring further to FIG. 1, the powershift transmission 10 and the control system will be described in greater detail. The transmission 10 includes an input shaft 32 and an output shaft 34. A fluid operated directional control clutch 36 conditions the transmission for forward drive when it is engaged and a fluid operated reverse clutch 38 conditions the transmission for reverse drive when it is energized. A plurality of fluid operated speed ratio clutches 42, 44, 46 and 48, when engaged, condition the transmission for drive in first, second, third and fourth speed ratios, respectively. A more detailed description of the transmission of this type is set forth in Bolster U.S. Pat. No. 3,126,752.

The control unit 12 includes a plurality of valves which control the flow of pressurized fluid for operating the various fluid actuated clutches of the transmission. The pressurized fluid is supplied to the control unit 12 from a hydraulic pump 52. A directional control valve 54 is manually actuable by the reversing lever 16 which has forward, neutral and reverse positions. When the lever is in the forward position, the valve 54 admits fluid pressure to the forward clutch 36 and when it is in the reverse position the valve admits fluid pressure to the reverse clutch 38 for engagement thereof. When the control lever is in the neutral position neither the forward nor reverse clutches are engaged and the output shaft of the transmission is not driven. The control unit 12 also includes a speed control valve 56 which is manually actuable by the gear selector lever 14. This selector lever has four positions corresponding to first, second, third and fourth gears and, when the valve 56 is positioned in the first, second, third and fourth positions, the first gear clutch 42, the second gear clutch 44, the third gear clutch 46 and the fourth gear clutch 48 are engaged, respectively.

In order to provide for automatic shifting between first and second gears, the transmission is provided with a downshift valve means 58. This valve means includes plural valves that serve to channel fluid pressure to the forward and reverse clutches 36 and 38 and to the first, second, third and fourth speed ratio clutches 42, 44, 46 and 48, respectively. This downshift valve means includes a second speed clutch valve 62 which selectively controls the fluid pressure to the second speed clutch 44. This second speed clutch valve 62 is actuated by a transfer valve 64 which in turn is controlled by the solenoid valve 18. The solenoid valve receives fluid pressure through the conduit 66 from the control unit and has an outlet port connected through a conduit 68 with the transfer valve 64. When the solenoid valve 18 is deenergized, fluid pressure is admitted to the transfer valve 64 and the second gear clutch valve 62 is actuated to engage the second gear clutch 44.

When the second gear clutch 44 is engaged, the fluid pressure in the downshift valve means 58 is effective to open a pressure actuated switch 184 in the gear signal means 28. As stated above, the second gear signal is applied to the input of the automatic control system 20. The speed transducer 22 is a rotary electromagnetic sinewave generator connected with third speed clutch 46. The speed transducer 22 develops a sinewave voltage having a frequency corresponding to the road speed of the vehicle and is applied to the automatic shift control system 20. As previously noted, the reversing signal means 24 develops a reversing signal when the manual reversing lever 16 is moved between the forward and reverse position. The reversing signal is applied to the automatic shift control system 20. The on/off selector 26 is connected with the automatic shift control system and is manually operative to turn the control system on or off.

The Automatic Shift Control System

In operation of a work vehicle such as a front-end loader, the operator may manually control the gear shifting by the gear selector lever 14 and manually controls reversing by the reversing control lever 16. In front-end loader operations, the operator is occupied with manual steering and bucket operations and it is inconvenient for him to manually shift between first and second gears, in addition to direction reversing as required in loading-unloading operations. In order to relieve the operator from the manual shifting the manual shifting between first and second gears, the automatic shift control system provides speed responsive shifting between first and the second gears when the gear selector is placed in second gear. Further, the automatic shift control system includes, according to this invention, means for automatically inhibiting downshifting during direction reversal to protect the driveline against shock but it permits upshifting during reversal.

Figure 2:
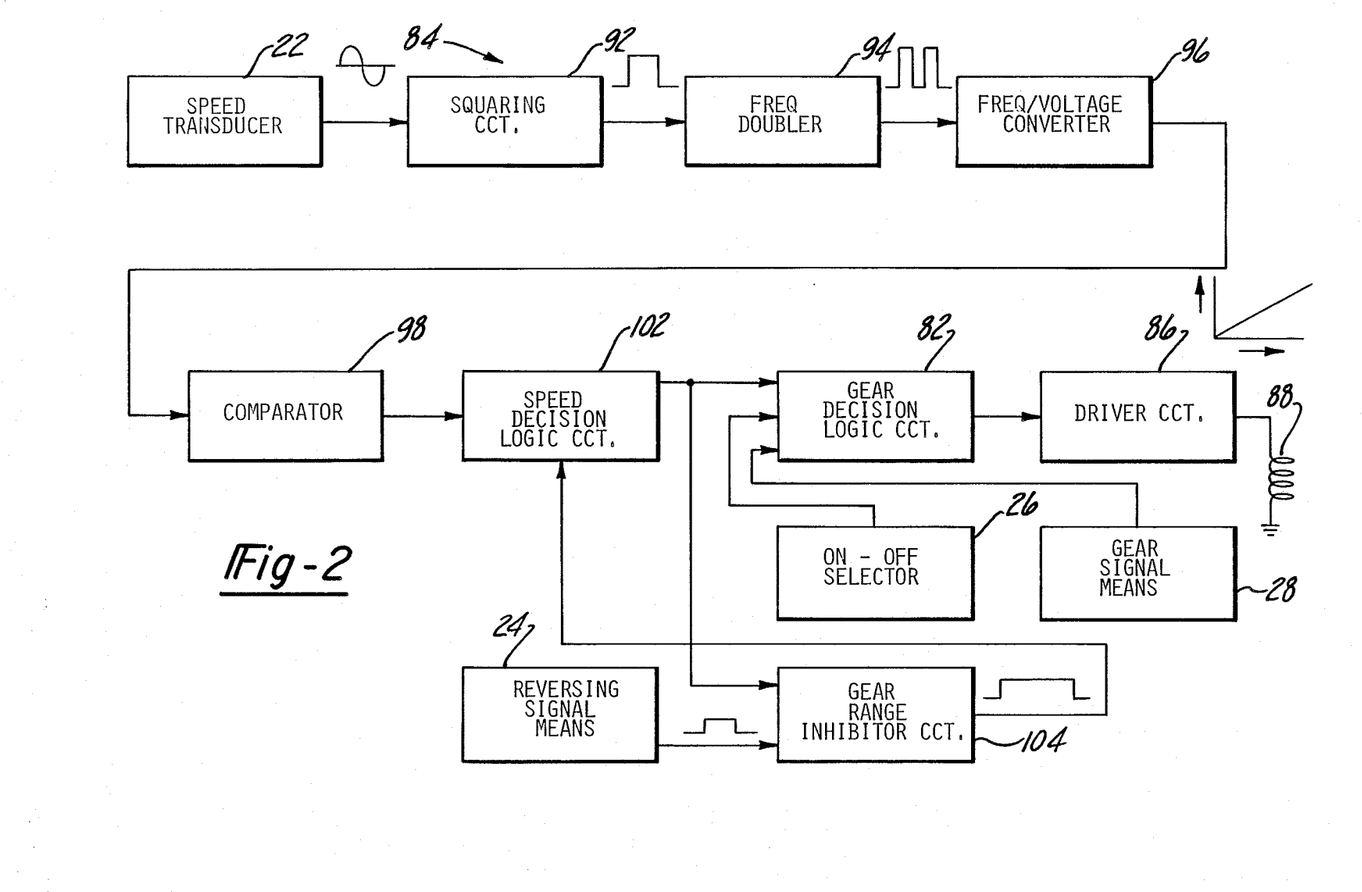
FIG. 2 is a block diagram of the automatic shift control system.

The automatic shift control system 20 will now be described with reference to the block diagram of FIG. 2. In general, it comprises a gear decision logic circuit 82 which develops a control signal for automatic shifting of the transmission between first and second gears. The gear decision logic circuit 82 develops a control signal in response to an input signal from a speed command channel 84 when the on/off selector 26 is set for automatic and when the gear signal means 28 indicates that the gear selector lever is positioned in second gear. The control signal from the gear decision logic circuit 82 is a first gear or second gear signal and is applied to a driver circuit 86 which is adapted to energize or deenergize the solenoid 88 of the solenoid valve 18 in accordance with the control signal.

The speed command channel 84 includes the speed transducer 22 which, as previously noted, develops a sinewave voltage corresponding to the road speed of the vehicle. The output of the speed transducer 22 is applied to the squaring circuit 92 which converts the sinewave input to a square wave output pulse train of positive pulses having a repetition rate corresponding to the frequency of the sinewave. The output of the squaring circuit is applied to a frequency doubler 94 which produces an output pulse train of square wave pulses having a repetition rate which is twice as great as the input pulse train. The output of the frequency doubler 94 is applied to a frequency-to-voltage converter 96 which develops an analog voltage having a magnitude proportional to the pulse repetition rate of the input. Thus, the output of the frequency-to-voltage converter 96 is a DC speed signal having a magnitude corresponding to the value of the road speed of the vehicles. The speed signal is applied to a comparator 98 which develops a shift point signal corresponding to upshift and downshift speeds. For example, an upshift signal is produced when the speed increases above 22 MPH and a downshift signal is produced when the speed decreases below 19 MPH. The shift point signal from the comparator 98 is applied to the input of a speed decision logic circuit 102.

The speed decision logic circuit 102 develops an output shift signal, either an upshift or a downshift signal, which is applied to the input of the gear decision logic circuit 82. The speed decision logic circuit 102 also receives an input from a gear range inhibitor circuit 104. The reversing signal means 24 produces a reversing signal each time the reversing lever 16 is moved from forward to reverse or vice-versa. In response to the reversing signal, the gear range inhibitor circuit 104 develops an inhibit signal which is applied to the speed decision logic circuit and which prevents it from changing its output shift signal for the time duration of the inhibit signal. The inhibit signal has a duration which is at least as long as that required for reversing of the transmission to take place. It is desirable to prevent downshifting of the transmission during reversal but to permit upshifting. For this purpose, the output of the speed decision logic circuit 102 is applied to a second input of the gear range inhibitor circuit 104 for enabling and disabling it from producing an inhibit signal. When the output shift signal from the speed decision logic circuit 102 is an upshift signal the gear range inhibitor circuit 104 is enabled thereby to produce an inhibit signal in response to a reversing signal; however, when the output shift signal is a downshift signal, the inhibitor circuit 104 is disabled from producing an inhibit signal in response to a reversing signal.

The gear decision logic circuit 82 is operative to produce a control signal for shifting the transmission between first and second gears, provided that the other input signals to the logic circuit are appropriate for such operation. The on/off selector 26 produces an on/off signal for the gear decision logic circuit 82. When the selector is in the off position, there is no automatic shifting. The gear signal means 28 produces a gear signal which is applied to the logic circuit 82. When the gear signal is a second gear signal, signifying that the gear selector is in second gear, the logic circuit 82 is enabled to produce a control signal in accordance with the shift signal from the speed decision logic circuit 102. If the gear signal is not a second gear signal, signifying that the speed ratios selector lever is in some position other than second gear, there is no automatic shifting. Thus, when the on/off selector 26 is on and the gear selector is in second gear, the gear decision logic circuit 82 is enabled and will produce a control signal corresponding to the shift signal received from the speed decision logic circuit 102. The control signal is applied to the driver circuit 86 which controls the energization of the solenoid 88 in accordance with the shift signal. When the shift signal is an upshift signal, the solenoid 88 is deenergized and the transmission is shifted to second gear. When it is a downshift signal, the solenoid 88 is energized and the transmission is shifted to first gear.

Detailed Description of the Automatic Shift Control Circuit

Figure 3A:
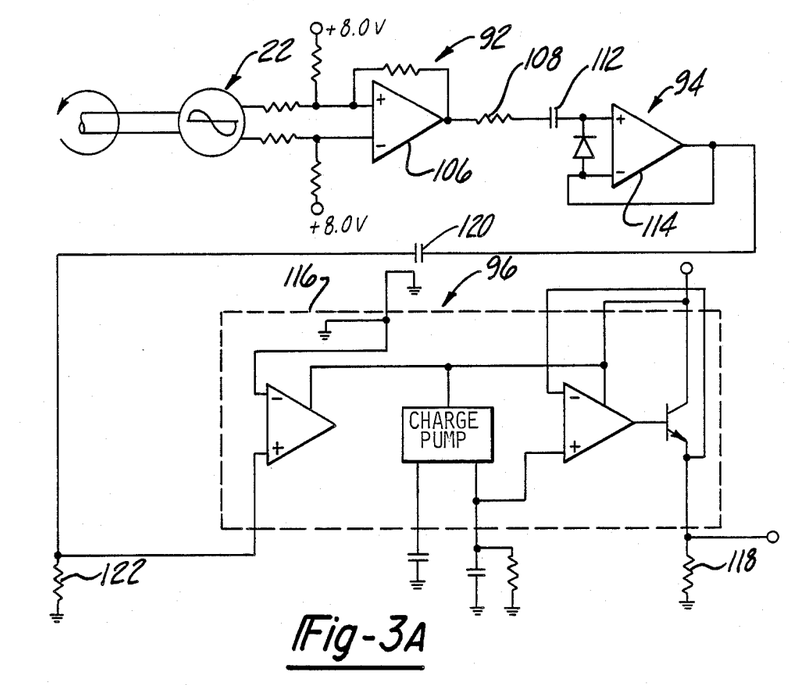
FIGS. 3A, 3B, 3C and 3D, taken together, constitute a schematic diagram of the shift control system.
Figure 3B:
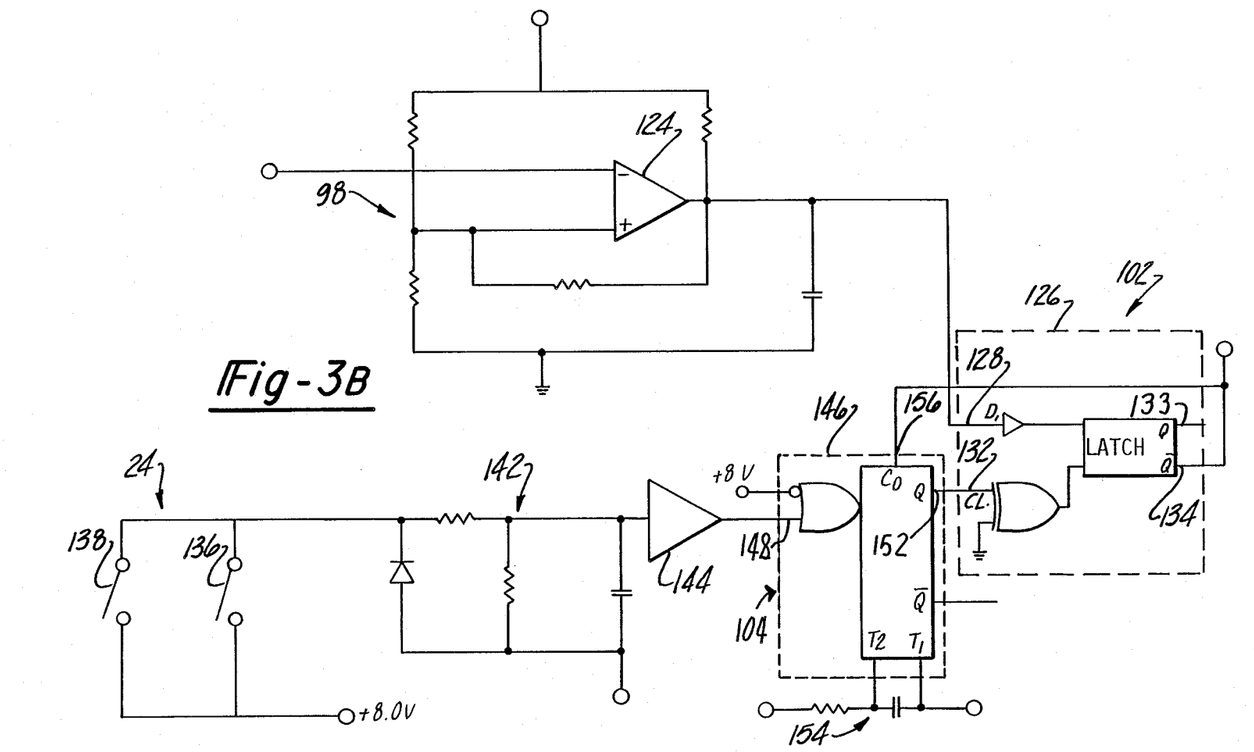
Figure 3C:
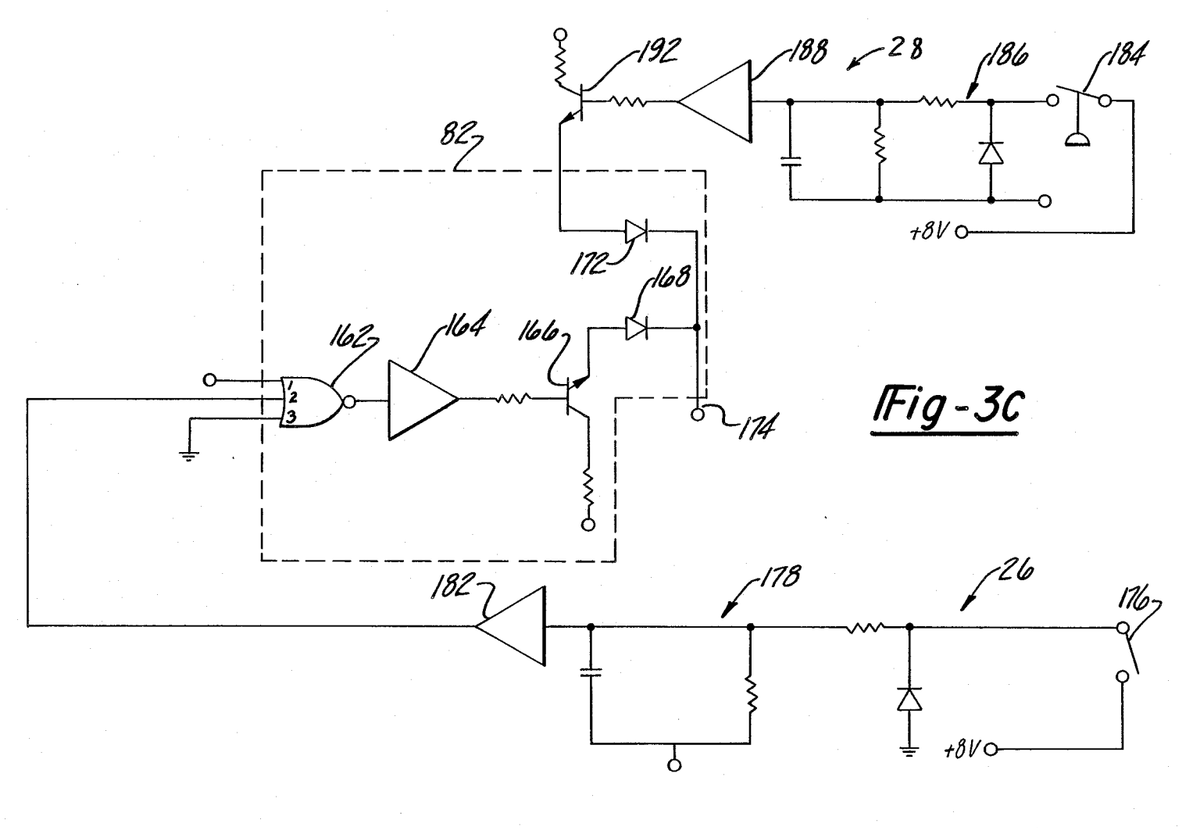
Figure 3D:
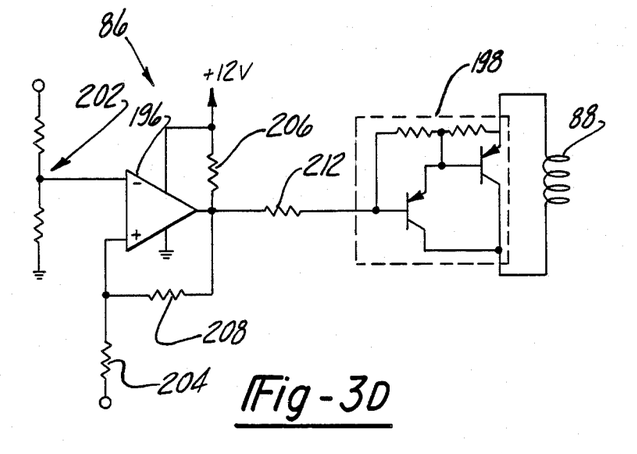

The automatic shift control circuit is shown schematically in FIGS. 3A, 3B, 3C and 3D. FIG. 3A shows the speed signal circuit including the speed transducer 22, the squaring circuit 92, the frequency doubler 94 and the freuqency-to-voltage converter 96. FIG. 3B shows the comparator 98, the speed decision logic circuit 102, the reversing switch 24, gear range inhibitor circuit 104, decision logic circuit 82 and the manual/automatic switch 26. FIG. 3C shows the gear decision logic circuit 82, the gear signal means 28 and the on/off selector 26. FIG. 3D shows the driver circuit 86 and the solenoid 88.

The Speed Signal Circuit

The speed signal circuit, as shown in FIG. 3A, comprises the speed transducer 22, the squaring circuit 92, the frequency doubler 94 and the frequency-to-voltage converter 96. As described above, the speed transducer 22 is a rotary electromagnetic generator which develops a sinewave voltage having a frequency corresponding to the road speed of the vehicle. The output of the transducer is applied to the input of the squaring circuit 92. The purpose of the squaring circuit 92 is to convert the sinewave voltage to a square wave pulse train having a repetition rate corresponding to the frequency of the sinewave and having a constant amplitude. The squaring circuit 92 is a conventional integrated circuit operational amplifier 106, suitably type LM-3301N. The operational amplifier 106 is implemented with circuit components such that the square wave output has a peak-to-peak excursion equal to the regulated supply voltage of 8.0 volts. It is effective to remove signal amplitude variations which arise from variations in speed of the speed transducer 22.

The output of the squaring circuit 92 is applied to the frequency doubler 94. The output of the squaring circuit 92 is coupled through a resistor 108 and a capacitor 112 to the input of the frequency doubler 94. The frequency doubler is provided to enhance the accuracy of the operating points for the upshift and the downshift between first and second gears which occur at relatively low speed. The frequency doubler 94 is a conventional integrated circuit operational amplifier 114, suitably an LN-3301N. The output of the frequency doubler 94 is a square wave having the same amplitude and twice the repetition rate as the input from the squaring circuit 92, and hence the output of the frequency doubler has a repetition rate corresponding to vehicle speed. This output is coupled to the input of the frequency-to-voltage converter 96 through a capacitor 120 and a resistor 122.

The voltage-to-frequency converter 96 is adapted to produce a DC output voltage proportional to the pulse repetition rate of the input signal. It is a conventional integrated circuit 116, suitably type LN-2907, having external components selected to provide the desired output voltage linearity, magnitude, ripple and response time for the upshift value of 22 RPM and downshift value of 19 RPM in the example of this illustrative embodiment. The output of the frequency-to-voltage converter 96 is developed across a resistor 122, as a DC voltage corresponding to vehicle speed. This output voltage is applied to the input of the comparator 98.

The Comparator, Speed and Gear Decision Logic Circuits and Manual/Automatic Switch The comparator 98, speed decision logic circuit 102, reversing signal means 24 and the gear range inhibitor circuit 104 are shown schematically in FIG. 3B. The comparator 98 is adapted to develop a shift point signal in digital form which corresponds to predetermined values of the speed signal in analog form from the frequency-to-voltage converter 96. It is desired to produce a digital upshift signal at a set point corresponding to the desired upshift speed of say 22 RPM and a digital downshift signal at a set point corresponding to say 19 RPM. For this purpose, the comparator 98 is provided with a controlled hysteresis or differential in its switching points in response to rising and falling input voltages.

The comparator 98 comprises an integrated circuit operational amplifier 124, suitably an LM-3302. The external circuit components are selected to provide the desired set points corresponding to the desired upshift speed and the downshift speeds. When the speed signal voltage at the input of the comparator 98 is increasing signal. The output will remain at logic low until the speed signal decreases below 19 RPM, at which point the output becomes logic high. This shift point signal from the comparator 98 is thus either an upshift signal or a downshift signal and is applied to the input of the speed decision logic circuit 102.

The speed decision logic circuit 102 is adapted to develop a shift signal in response to the shift point signals from the comparator 98. The speed decision logic circuit 102 comprises an integrated circuit latch 126, suitably an MC-14042. The latch 126 has a data input 128, a clock input 132, a Q output 133 and a $\bar{Q}$ output 134. The latch 126 operates in a well known manner; it produces an output signal at the Q output 133 which is the same as the logic signal at the input 128 so long as the logic signal at the clock input is low. The logic signal at $\bar{Q}$ output 134 is the inverse of the signal at output 133. If the logic signal at clock input 132 goes high the existing signal at the output 134 is latched, or held, so long as the clock input remains high, regardless of changes of the input signal. Thus, when the shift point signal at the input 128 is at logic high and the clock signal at input 132 is at logic low, the shift control signal at output 134 is at logic low. When the speed increases and the shift point signal at input 128 goes to logic low, the output signal at output 134 goes to logic high, provided that the inhibit signal at clock input 132 remains low. If, however, the inhibit signal goes high at clock input 132 and the shift point signals at input 128 goes high, the shift control signal at output 134 will remain high so long as the inhibit signal remains high at the clock input 132.

The gear range inhibitor circuit 104, shown in FIG. 3B, develops the inhibit signal which is applied to the latch 126 to inhibit downshifting during direction reversal. The reversing signal means 24 produces a reversing signal each time the reversing lever 16 is moved between forward and reverse positions. The reversing signal means 24 comprises switches 136 and 138 which are connected parallel between the logic voltage source and a filter network 142. The switch 136 is closed by movement of the reversing lever into forward position and switch 138 is closed by moving it into reverse position. Closure of either switch produces a positive-going voltage across the filter network 142. This reversing signal is applied from the filter network 142 through a non-inverting buffer 144 to the input of the gear range inhibitor circuit 104. The buffer 144 is an integrated circuit buffer, type MC-14050 and provides a full output swing regardless of the input signal level provided it is above a certain minimum value.

The gear range inhibitor circuit 104 comprises a re-triggerable and resettable monostable multivibrator for generating a time delay or inhibit signal. The multivibrator 146 is an integrated circuit of type MC-14538. An input 148 receives the reversing signal from the output of the buffer 144. The multivibrator develops the inhibit signal on output 152 which is connected to the clock input 132 of the latch 126. The multivibrator is provided with an external time constant circuit 154 which establishes the duration of the inhibit signal on output 152. The multivibrator is responsive to the leading edge of the positive-going reversing signal to generate the instarted over again. The reset input 156 is connected with the output 134 of the latch 126 and the shift signal developed thereby serves as a reset signal for the multivibrator. When the shift signal at output 134 of the latch is an upshift signal, i.e. at logic high, it resets the multivibrator so that it is responsive to triggering by a reversing signal to produce an inhibit signal. However, when the shift signal is a downshift signal, i.e. at logic low, the multivibrator 146 is not reset and it is not responsive to triggering by a reversing signal. Accordingly, no inhibit signal is generated when a reversing signal occurs with the transmission in first gear, i.e. with the shift signal at logic low.

Gear Decision Logic Circuit, On/Off Selector and Gear Signal Means

The gear decision logic circuit 82 is shown in FIG. 3C. It comprises a NOR gate 162, a buffer 164, a transistor 166 and a pair of steering diodes 168 and 172. The gear decision logic circuit 82 is adapted to develop a control signal for controlling the energization of the solenoid 88 in response to the shift signal from the speed decision logic circuit when the automatic shift control system is turned on and when the transmission gear selector lever is placed in second gear. For this purpose, the shift signal from the speed decision logic circuit 102 is applied to input 1 of the NOR gate 162. The on/off signal from the on/off selector 26 is applied to input 2 of the NOR gate 162 and input 3 of the NOR gate is connected to ground. The output of the NOR gate is applied through the buffer 164 to the input of the transistor 166. The control signal developed by the gear decision logic circuit 82 is developed on output 174.

The on/off selector 26 comprises a manually actuable switch 176 which has one terminal connected with the logic level voltage source and the other terminal connected with the input of a filter circuit 178 which has its output connected to the input of a buffer 182. The output of the buffer is connected with input 2 of the NOR gate 162. When the switch 176 is closed, a logic high voltage is developed at input 2 of gate 162 and turns the automatic control system off. When the switch 176 is open, a logic low voltage is applied to input 2 of the NOR gate 162 and turns the automatic system on.

The gear signal means 28 is also shown in FIG. 3C and supplies a gear signal to the gear decision logic circuit 82. The gear signal means 28 comprises a switch having one terminal connected with the logic level voltage source and its other terminal connected through a filter circuit 186 to the input of a buffer 188. The output of the buffer is connected with the input of a switching transistor 192 which has its output connected through the steering diode 172 to the output 174 of the gear decision logic circuit 82.

When the transmission is manually shifted to second gear, i.e. the gear selector lever 14 is in second gear position, the switch 184 is open. This switch is a pressure actuated switch which is responsive to the fluid pressure in the downshift valve 58. With the switch 184 open, the gear signal is at logic low at the input of transistor 192 and the output 174 is unaffected by the gear signal, i.e. it is either at logic low or logic high depending upon the output of the NOR gate 162 and transistor 166. If, on the other hand, the transmission is not in second gear, the switch 184 is closed and the gear signal is at logic high which turns on transistor 192 and a logic high control signal is developed at the output 174. Thus, the control signal at output 174 is held at logic high and the automatic control system is effectively turned off.

The Driver Circuit

The driver circuit 86 for the solenoid 88 is shown in FIG. 3D. This circuit comprises an integrated circuit operational amplifier 196 and an integrated circuit Darlington power driver stage 198. The output of the driver stage 198 is connected with the solenoid 88 for energization thereof. The operational amplifier 196 is used as a voltage translator in that it accepts a logic level input voltage and develops a higher output voltage at the level of the battery voltage of the system. The amplifier 196 is suitably a type LM-2901 and has its inverting input connected with the reference voltage from a voltage divider 202. The control voltage from the gear decision logic circuit 82 at output 174 is applied to the non-inverting input of the amplifier 196 through a series resistor 204. The output of the amplifier 196 is connected through a resistor 206 to the battery supply voltage and is also connected through a feedback resistor 208 to the non-inverting input. The output of the operational amplifier 196 is applied through a coupling resistor 212 to the input of the driver stage 198. The driver stage 198 is an integrated circuit Darlington power driver type MJC-1090. The output terminals of the driver stage 198 are connected directly across the terminals of the solenoid 88. When the driver stage 198 is on, the solenoid 88 is on. With the solenoid on, i.e. in the energized condition, the transmission is operable in the manual mode for the selection of any of the gears. When the solenoid 88 is on, with operation in the automatic mode, the transmission is shifted to first gear. When it is off, the transmission is shifted to second gear.

Operation

Figure 4:
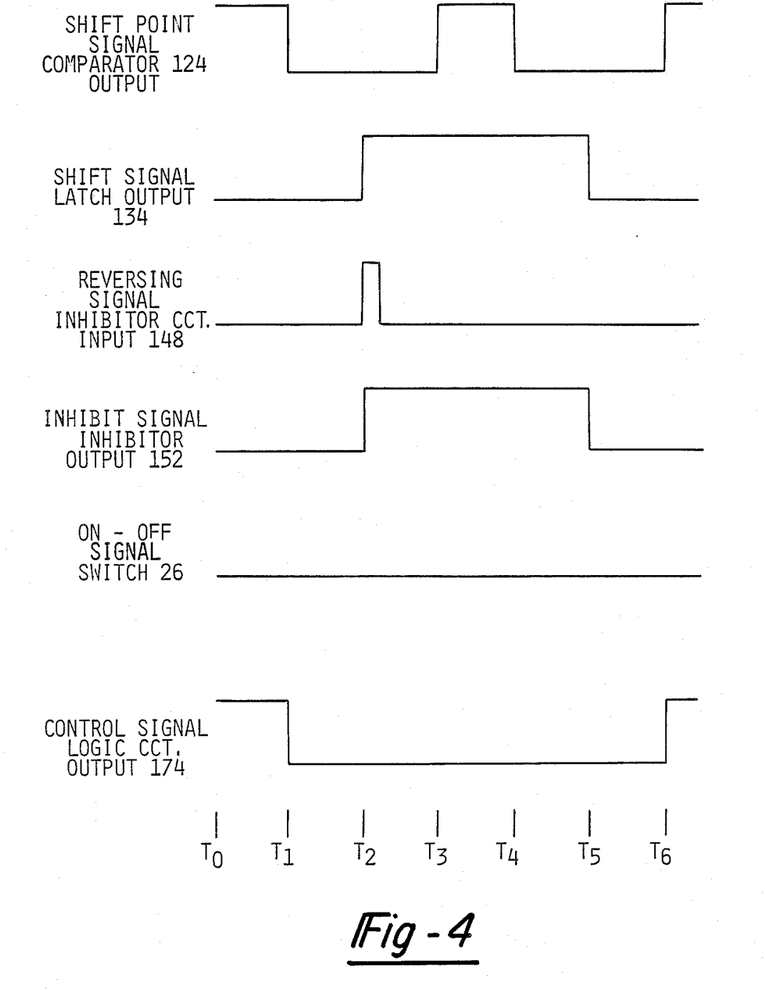
FIG. 4 is a timing diagram to aid in explanation of the operation of the invention.

The operation of the automatic shift control system will now be described with reference to the schematic diagrams of FIGS. 3A, 3B, 3C and 3D and the timing diagram of FIG. 4. As an initial condition, at time $t_0$, it is assumed that the automatic on/off switch 176 is on, i.e. the switch is open and a logic low voltage is applied to input 2 of the NOR gate 162. This places the gear decision logic circuit 82 in a state for automatic shift control. The gear selector lever 14 is manually positioned in the second gear position and thus the switch 184 is open. Thus, a logic low voltage is produced at the output of the transistor 192 and places the gear decision logic circuit 82 in a state for automatic shift control. In this initial condition, the speed signal at the output of the frequency-to-voltage converter 96 is at a low value and increasing toward the upshift point of 22 RPM. Reference is now made to FIG. 4. In this operating condition, the shift point signal produced at the output of comparator 124 is at logic high and is applied to the data input of the latch 126. There is no reversing signal from the reversing switch 24 and no inhibit signal from the inhibitor circuit 104 and thus the clock input 132 of the latch 126 is at logic low. Accordingly, the logic state at the data input 128 is inverted at the output 134. Thus, the shift signal at this latch output is at logic low. Consequently, at time $t_0$ the control signal at the output 174 of the gear decision logic circuit 82 is at logic high. This logic high control signal is applied to the input of the driver circuit 86 and the solenoid 88 is energized which maintains the transmission in first gear.

Assuming that the vehicle speed continues to increase and reaches the upshift point of 22 RPM at time $t_1$, the shift point signal at the output of comparator 124 will go to logic low. The inhibit signal remains low at the latch input 132 and consequently, the shift signal at the latch output 134 goes to logic high. This causes the control signal at the output 174 of the gear decision logic circuit 82 to go to logic low. As a result, the driver circuit 86 turns off the solenoid 88 and the transmission is upshifted to second gear.

With the road speed above the upshift point of 22 RPM, assume that the operator reverses the direction at time $t_2$. This causes the reversing signal to be generated by the reversing signal means 24 starting at time $t_2$ and the inhibitor circuit 104 produces an inhibit signal, i.e. a logic high voltage at output 152. The inhibit signal is initiated at time $t_2$ and the multivibrator 146 commences to time-out. The inhibit signal is applied to the clock input 132 of the latch 126 and thus the shift signal on output 134 is latched or held at logic high for the duration of the inhibit signal. Thus, there is no change of state in the control signal and the solenoid 88 remains deenergized with the transmission held in second gear.

The reversal of the drive direction causes the vehicle to decelerate and the speed signal will decrease below the value preset for downshift, i.e. 19 RPM at time $t_3$. Thus, at this time the shift point signal at the output of comparator 124 goes to logic high and this signal is applied to the data input 128 of the latch 126. However, the inhibit signal remains at logic high at the clock input 132 of the latch 126 and hence the shift signal at the latch output 134 does not change stage and thus remains at logic high. Consequently, the control signal at output 174 of the gear decision logic circuit 82 remains at logic low so that the solenoid 88 remains deenergized and the transmission is held in second gear. The inhibit signal was thus operative to prevent a downshift during reversal.

The vehicle decelerates to zero ground speed and then accelerates until, at time $t_4$, the upshift point is reached. This causes the shift point signal at the output 124 of the comparator to go to logic low. The shift signal at the output 134 of latch 126 is already at logic high and thus the control signal remains at logic low. Accordingly, the solenoid 88 remains deenergized and the transmission remains in second gear.

At time $t_5$, the multivibrator 146 times out and the inhibit signal goes to logic low. Accordingly, the clock input 132 of the latch 126 goes to logic low and the shift signal at output 134 goes to the inverse of the shift point signal at the data input 128. In other words, the shift point signal at time $t_5$ is at logic low and therefore the shift signal at the output 134 remains at logic high. Consequently, the control signal at output 174 of the gear decision logic circuit 82 remains at logic low and the solenoid 88 remains deenergized with the transmission in second gear.

In the operation just described, it was assumed that the vehicle was accelerated from a low road speed through the upshift point and then the drive direction was reversed; as a result, the vehicle decelerated below the downshift point. However, the inhibit signal prevented a downshift following drive reversal for a time period sufficient so that the drive direction reversal was completed before downshifting could occur. Consequently, the vehicle driveline was protected from damaging shock which would be caused by downshifting during reversal.

It will be apparent from the description that the automatic shift control system permits upshifting during drive reversal. With the vehicle operating in first gear, the shift point signal at the output of the comparator 124 is at logic high and the shift signal at the output 134 of the latch 126 is at logic low. This shift signal is applied to the reset input 156 of the multivibrator 146. As a result, the multivibrator is disabled from producing an inhibit signal at output 152 (a logic high) in response to a reversing signal at the input 148. Thus, if the operator reverses the vehicle while it is in second gear there will be no inhibit signal; the vehicle will decelerate to zero speed and then accelerate in accordance with the throttle setting. If the speed increases to the upshift point, the shift point signal at the output of the comparator 124 will go to logic low. Since there is no inhibit signal at the clock input 132 of the latch 126 the shift signal and the output 134 of latch 126 will go to logic high. This will cause the control signal at output 174 of the gear decision logic circuit 82 to go to logic low. As a result the solenoid 88 will be deenergized and the transmission will be upshifted to second gear during the reversal of drive direction. This upshifting during reversal is permissible inasmuch as it does not impose harmful shock on the driveline.

Although the description of this invention has been given with reference to a particular embodiment, it is not to be construed in the limiting sense. Many variations and modifications will now occur to those skilled in the art. For a definition of this invention, reference is made to the appended claims.

What is claimed is:

1. For use in a vehicle of the type having an engine coupled with traction wheels through a driveline including a change-speed transmission, said transmission including drive direction reversing means, a drive direction selector for manual control of the reversing means and having a forward and reverse position, said transmission including ratio changing means, a manual gear selector for operation of the ratio changing means for shifting the transmission into a selected gear, and control means responsive to a control signal for upshifting and downshifting between first and second gears, the inprovement comprising:

a speed signal generator adapted to be coupled with said driveline for producing a speed signal corresponding to the speed of the vehicle,     a shift point signal means coupled with the speed signal generator and responsive to said speed signal for producing a second gear signal when the speed signal increases above a first predetermined value and a first gear signal when the speed signal decreases below a second predetermined value,     a reversing signal generator connected with said drive direction selector and adapted to produce a reversing signal in response to movement of the selector means between forward and reverse positions,     inhibit means responsive to the reversing signal for producing an inhibit signal having a predetermined time duration after the occurrence of said reversing signal,     speed decision logic means including means coupled with the shift point signal means and responsive to the second gear and first gear signals for producing respective upshift and downshift signals and being responsive to an inhibit signal for delaying the change from an upshift signal to a downshift signal for a time interval corresponding to the duration of the inhibit signal, said time interval being at least as long as the time required for operation of said reversing means, whereby the transmission cannot be downshifted while the drive reversing means is being actuated, a manually actuable mode selector means for producing an on signal or an off signal, and gear decision logic means having a first input coupled with the speed decision logic means, a second input coupled with the mode selector means and an output coupled with said control means, said gear decision logic means being operative to develop a second gear or first gear control signal in response to the upshift or downshift signals respectively from the speed logic means when the mode selector produces an on signal and being operative to develop only a second gear when the mode selector produces an off signal.

2. The invention as defined in claim 1 including:

disabling means coupled with inhibit means for disabling it when the shift point signal means produces an upshift signal, whereby the transmission can be upshifted while the drive reversing means is being actuated.

3. The invention as defined in claim 1 including:

a gear signal means for producing a second gear sognal when said second gear is selected and for producing a first gear signal when any other gear is selected, said gear decision logic means having a third input coupled with the gear signal means and being enabled by a second gear signal for producing a second gear of first gear control signal in response to the upshift or downshift signal, respectively, from the speed logic means and being disabled by a first gear signal from producing a first gear control signal in response to a downshift signal.

4. The invention as defined in claim 1 wherein, said speed decision logic means comprises a latch having a data input, a data output and a click input, said data input being connected with the shift point signal means, said clock input being connected with the inhibit means and said data output being connected with the input of the gear decision logic means.

5. The invention as defined in claim 3 including:

a driver circuit, said gear decision logic means comprising a NOR gate and a pair of steering diodes, the output of the NOR gate being connected through one of the steering diodes to said driver circuit, and the gear signal means being connected through the other steering diode to said driver circuit.

6. The invention as defined in claim 5 wherein, said driver circuit includes:

a driver stage and a comparator, said comparator having one input coupled with the outputs of said diodes and the other input connected with a source of reference voltage and an output connected with said driver stage, said driver stage being coupled with said control means for energizing it in accordance with said upshift and downshift control signals.

* * * * *